United States Patent
David

(10) Patent No.: US 12,461,806 B2
(45) Date of Patent: **\*Nov. 4, 2025**

(54) ROM/OTP PATCHING USING ECC/PARITY MANIPULATION

(71) Applicant: Silicon Laboratories Inc., Austin, TX (US)

(72) Inventor: Thomas David, Lakeway, TX (US)

(73) Assignee: Silicon Laboratories Inc., Austin, TX (US)

( \* ) Notice: Subject to any disclaimer, the term of this patent is extended or adjusted under 35 U.S.C. 154(b) by 55 days.

This patent is subject to a terminal disclaimer.

(21) Appl. No.: 18/225,471

(22) Filed: Jul. 24, 2023

(65) Prior Publication Data

US 2025/0036504 A1    Jan. 30, 2025

(51) Int. Cl.
    G06F 11/07    (2006.01)
    G06F 8/65     (2018.01)

(52) U.S. Cl.
    CPC ............ *G06F 11/0772* (2013.01); *G06F 8/65* (2013.01); *G06F 8/66* (2013.01); *G06F 11/0793* (2013.01)

(58) Field of Classification Search
    CPC ...................................................... G06F 8/65
    See application file for complete search history.

(56) References Cited

U.S. PATENT DOCUMENTS

| | | | |
|---|---|---|---|
| 6,604,214 B1 * | 8/2003 | Fukushima | G06F 11/1008 365/185.33 |
| 7,310,800 B2 | 12/2007 | Brouwer | |
| 7,739,469 B2 | 6/2010 | Jessani et al. | |
| 7,886,287 B1 | 2/2011 | Davda | |
| 11,106,457 B1 | 8/2021 | Subramanian et al. | |
| 2004/0015939 A1 * | 1/2004 | Cheah | G06F 8/60 711/100 |
| 2008/0184072 A1 | 7/2008 | Odlivak et al. | |
| 2011/0107070 A1 | 5/2011 | Barbulescu et al. | |
| 2012/0030762 A1 | 2/2012 | Klein et al. | |
| 2018/0294036 A1 * | 10/2018 | Oh | G11C 29/50004 |
| 2024/0264825 A1 | 8/2024 | Grannaes | |

FOREIGN PATENT DOCUMENTS

| | | | | |
|---|---|---|---|---|
| JP | 2001117782 A | * | 4/2001 | |
| JP | 2018041402 A | * | 3/2018 | |
| JP | 7161583 B1 | * | 10/2022 | .......... G06F 11/0757 |

OTHER PUBLICATIONS

Office Action mailed Jul. 5, 2024 in co-pending U.S. Appl. No. 18/106,766.
Notice of Allowance mailed Nov. 22, 2024 in co-pending U.S. Appl. No. 18/106,766.

\* cited by examiner

*Primary Examiner* — Phillip H Nguyen
(74) *Attorney, Agent, or Firm* — Nields, Lemack & Frame, LLC

(57) ABSTRACT

Methods of performing updates to a software image that is disposed in a read only memory or a one time programmable memory device are disclosed. The method includes causing an ECC error at the beginning of a function that has been modified. This ECC error causes an exception. The exception handler determines the address where the ECC error was detected was located and searches a dictionary. This dictionary contains entries that each have an original address in the ROM or OTP Memory and the patch address in a nonvolatile writable memory. The exception handler then causes the processing unit to jump to the patch address, where a modified function is located.

17 Claims, 5 Drawing Sheets

ROM/OTP PATCHING USING ECC/PARITY MANIPULATION

FIELD

This disclosure describes a method for patching code located in one time programmable (OTP) memory or read only memory (ROM) by manipulating the parity or ECC.

BACKGROUND

In many network devices, FLASH memory is used to store the code that is executed by the network device. FLASH memory has the benefit that it is rewritable, so that any changes, bug fixes, or enhancements that are made to the code after the device has been delivered to a customer can be easily applied to the network device.

Typically, this may be done by delivering a patch file to the network device. This patch contains file the changes, modifications and enhancements that are to be applied to the code. The network device may store this new code in volatile memory, such as RAM. The FLASH memory is then reprogrammed using this new code.

However, in some embodiments, it may be beneficial to utilize read only memory (ROM) or one time programmable (OTP) memory in a network device. This may be due to cost constraints or another motivation. The technique described above is not suitable for ROM and OTP memories, since these memories cannot be reprogrammed.

There are other patching techniques that are used for read only memory (ROM). These techniques include creating jump tables in the code to allow for the possibility that functions may be changed. This approach requires that jump tables are located in RAM or OTP. When a function is called, the software looks to the jump table to determine the address of the function (i.e., in ROM or in OTP/RAM). When patches are later applied to the software, the jump table is updated to point to the new patched functions. However, writing code that utilizes a lookup table in RAM/OTP is very complex.

Therefore, it would be beneficial if there was a method that allowed the patching of code located in ROM or OTP memory that was simple to implement.

SUMMARY

Methods of performing updates to a software image that is disposed in a read only memory or a one time programmable memory device are disclosed. The method includes causing an ECC error at the beginning of a function that has been modified. This ECC error causes an exception. The exception handler determines the address where the ECC error was detected and searches a dictionary. This dictionary contains entries that each have an original address in the ROM or OTP Memory and the patch address in a nonvolatile writable memory. The exception handler then causes the processing unit to jump to the patch address, where a modified function is located.

According to one embodiment, a method of updating software located in a read only memory (ROM) device is disclosed. The method comprises storing a modified function at a patch address in a nonvolatile writable memory device; creating an entry in a dictionary located in the nonvolatile writable memory device, wherein the entry comprises an original address of an original function in the ROM device and the patch address; and causing an ECC error to occur when the original address in the ROM device is accessed so as to invoke an exception. In some embodiments, a modification flag is associated with each instruction in the ROM device, wherein each modification flag has a first value when the instruction in the ROM device is to be executed and a second value when a patched function is available, and causing the ECC error comprises the second value to the modification flag associated with an instruction at the original address. In certain embodiments, the modification flags are stored in the nonvolatile writable memory device. In certain embodiments, the modification flags are stored in a volatile memory. In certain embodiments, the modification flag is provided to an input to a processing unit which is used to indicate the ECC error.

According to another embodiment, a method of executing instructions located in a read only memory (ROM) device or a one time programmable (OTP) memory device, using a processing unit, wherein the instructions include a function that has been modified and a patched function is located at a patch address in a nonvolatile writable memory device, is disclosed. The method comprises encountering an ECC error at an original address in the ROM device or OTP memory device; invoking an exception handler, wherein the exception handler: determines a value of a program counter when the ECC error occurred, the value of the program counter being the original address; and uses the original address to index into a dictionary to find the patch address; and executing the patched function located at the patch address. In some embodiments, a modification flag is accessed with each instruction in the ROM device or OTP memory device, and the modification flag is used to cause the ECC error. In certain embodiments, the function is located in an OTP memory device. In some embodiments, data at the original address includes an instruction and a modification flag, and the modification flag is used to cause the ECC error. In some embodiments, data at the t original address includes an instruction, an ECC and a modification flag, and the modification flag is combined with the ECC to create an updated ECC value, wherein the updated ECC value is used to cause the ECC error. In some embodiments, after the ECC error is detected, the exception handler checks a state of the modification flag to determine if a patched function is available.

According to another embodiment, a method of updating software located in a one time programmable (OTP) memory device is disclosed. The method comprises storing a modified function at a patch address in a nonvolatile writable memory device; creating an entry in a dictionary located in the nonvolatile writable memory device, wherein the entry comprises an original address of an original function in the OTP memory device and the patch address; and causing an ECC error to occur when the original address in the OTP memory device is accessed so as to invoke an exception. In some embodiments, a width of the OTP memory device is configured to include an instruction and a modification flag, and causing the ECC error comprises writing a second value, different than a default value, to the modification flag. In certain embodiments, the modification flag is provided to an input to a processing unit which is used to indicate an ECC error. In some embodiments, a width of the OTP memory device is configured to include an instruction, an ECC and a modification flag, and causing the ECC error comprises writing a second value, different than a default value, to the modification flag. In certain embodiments, the modification flag is combined with the ECC to create an updated ECC value and the updated ECC value is used to detect whether an ECC error occurred. In some embodiments, the nonvolatile writable memory device is the OTP memory device, such that the original function, the dictionary and the modified function are all resident within the OTP memory device.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
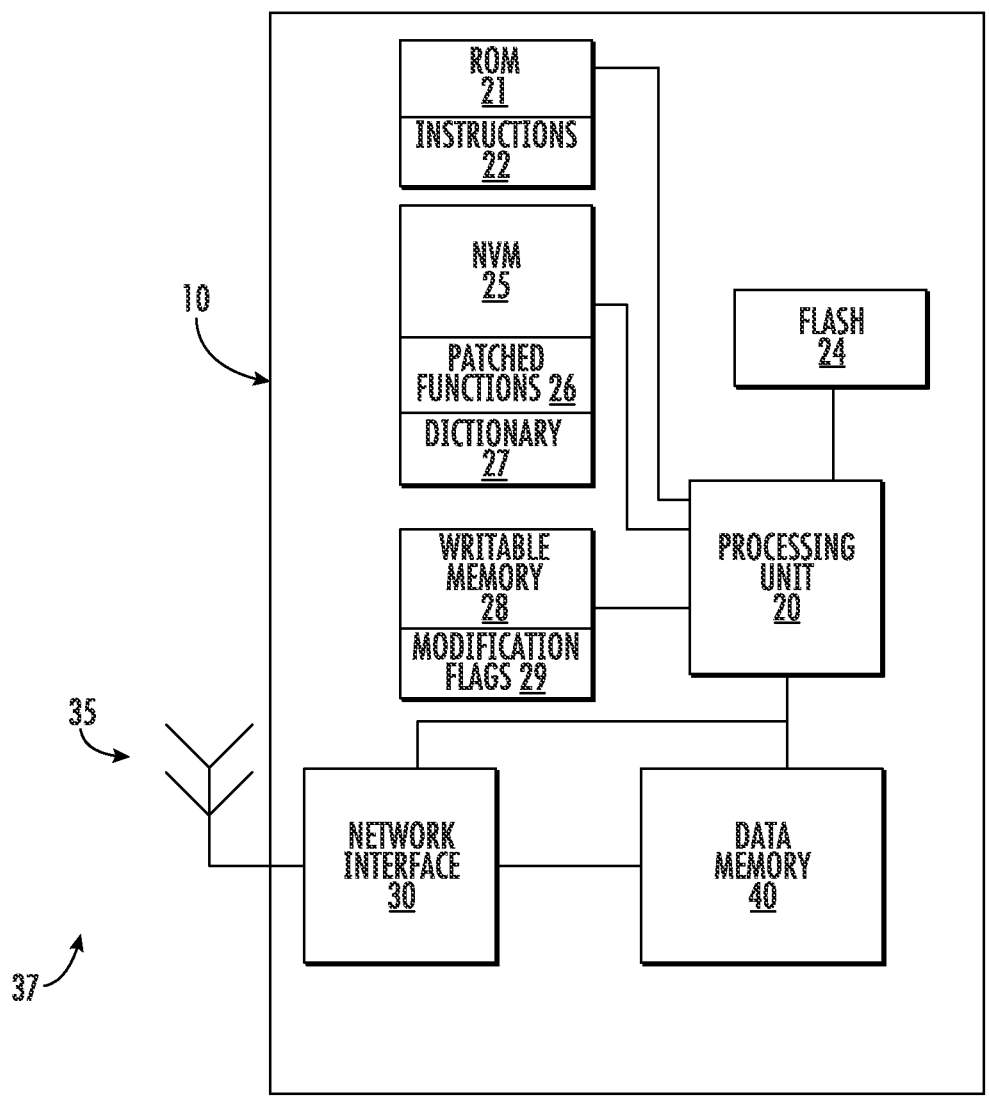
FIG. 1 shows a block diagram of a network device according to one embodiment.

FIG. 1 shows a first embodiment of a block diagram of a representative network device 10 that is adapted to implement the method of patching code described herein.

The network device 10 has a processing unit 20 and associated memory devices. The processing unit 20 may be any suitable component, such as a microprocessor, embedded processor, an application specific circuit, a programmable circuit, microcontroller, or another similar device. The processing unit 20 may be a component of a system on a chip (SoC) that includes a plurality of functions. The processing unit 20 also includes an input that indicates that a parity or ECC error was detected on the data being accessed.

The associated memory devices include a read only memory (ROM) device 21. This ROM device 21 contains the instructions 22, which, when executed by the processing unit 20, enable the network device 10 to perform the desired functions.

The associated memory devices also include a nonvolatile writable memory device 25, such as a one time programmable (OTP) memory device or a FLASH memory device. The nonvolatile writable memory device 25 contains the patched functions 26, as described in more detail later. The nonvolatile writable memory device 25 also contains a dictionary 27, also described in more detail below. Thus, the ROM device 21 and the nonvolatile writable memory device 25 are both computer readable non-transitory storage media.

The associated memory devices also include a writable memory 28, which contains modification flags 29, associated with each instruction in the ROM device 21. These modification flags 29 indicate whether that corresponding instruction has been patched. For example, if the ROM is 64 Kbytes, organized as 16K×32 bits, there may be 16K modification flag bits (16 Kbits) in the writable memory 28, wherein each modification flag bit is associated with one of the 32 bit wide instructions. In one embodiment, the writable memory 28 may be incorporated into the nonvolatile writable memory device 25. In another embodiment, the writable memory 28 may be stored in a volatile memory, such as a random access memory (RAM) device. In another embodiment, the writable memory 28 may be configured as a plurality of flip-flops resident on the SoC.

The network device 10 also includes a network interface 30 that connects with a network 37 using an antenna 35. The network interface 30 may support any wireless protocol, such as Bluetooth, Zigbee, WIFI or others. In other embodiments, an antenna 35 is not included, and the network interface 30 supports a wired protocol, such as Ethernet.

The network device 10 may include a data memory device 40 in which data that is received and transmitted by the network interface 30 is stored. This data memory device 40 is traditionally a volatile memory. The processing unit 20 has the ability to read and write the data memory device 40 so as to communicate with the other devices in the network 37.

Although not shown, the network device 10 also has a power supply, which may be a battery or a connection to a permanent power source, such as a wall outlet.

While the processing unit 20, the ROM device 21, the nonvolatile writable memory device 25, the writable memory 28, the network interface 30 and the data memory device 40 are shown in FIG. 1 as separate components, it is understood that some or all of these components may be integrated into a single electronic component. Rather, FIG. 1 is used to illustrate the functionality of the network device 10, not its physical configuration.

When the network device is initially powered, the processing unit 20 executes the instructions 22 located in the ROM device 21. The network device 10 may operate in this manner until some change to the instructions is required. As noted above, the instructions 22 are stored in ROM device 21, and therefore, the changes cannot be made directly to the instructions.

Thus, the changes to the instructions 22, which may be contained within a patch file downloaded to the network device, must be stored in the nonvolatile writable memory device 25. Specifically, the changes to the instructions, which are in the form of changes to software functions, are made in the nonvolatile writable memory device 25. These changes to software functions are stored as patched functions 26 in a portion of the nonvolatile writable memory device 25.

Thus, when functions in the instructions 22 need to be modified, the patched functions 26 are written into a portion of the nonvolatile writable memory device 25. In this way, when the processing unit 20 attempts to execute a function which has been modified, the processing unit 20 jumps to the respective patched function 26 in the nonvolatile writable memory device 25 and executes the patched function 26 from this location. After completing execution of the patched function 26, the processing unit 20 returns to an address located in the ROM device 21.

The present disclosure describes a method by which the processing unit 20 can detect a function that has been modified, and can jump to the associated patched function 26 which is stored at a known address in a portion of the nonvolatile writable memory device 25.

This method utilizes a dictionary 27, which is located in the nonvolatile writable memory device 25. The dictionary 27 is a table of entries, wherein each entry includes the address of the function to be modified (also known as the original address), and the address in the nonvolatile writable memory device 25 where the respective patched function is located (also referred to as the patch address). Thus, instead of executing the function located at the original address in the ROM device 21, the processing unit 20 executes the modified function located at the patch address in the nonvolatile writable memory device 25.

Thus, the dictionary 27 provides the correlation between original addresses in the ROM device 21 and patch addresses in the nonvolatile writable memory device 25. It is also necessary to have a mechanism wherein the processing unit 20 recognizes that it is about to execute a function that has been modified.

The present method addresses this issue by intentionally creating an ECC error for the instruction located at an original address in the ROM device 21. To do this, the processing unit 20 alters the modification flag 29 associated with this original address in the writable memory 28. Note that the modification flag 29 is used to generate the ECC error signal for the processing unit 20. Thus, when the modification flag 29 is set to a default or first value, such as 0, no ECC error is reported to the processing unit 20. However, if the modification flag 29 is set to a second value, such as 1, an ECC error is identified, which triggers the execution of an exception handler.

During operation, an instruction is retrieved from an address in the ROM device 21. This instruction may be 32 bits wide in some embodiments. Simultaneously, the modification flag associated with this address is retrieved from the writable memory 28. In some embodiments, the modification flags 29 may be stored in a writable memory that is 8 or 16 bits wide. In this scenario, the higher order bits of the address used to access the instruction in the ROM device 21 are used to determine which byte or word in the writable memory 28 to retrieve, while the lower order bits of the address are used to determine which bit in the retrieved byte or word is associated with this address.

Thus, after an instruction and its associated modification flag are read, if the modification flag 29 associated with that instruction is set to the second value, the processing unit 20 will execute an exception handler whenever it attempts to execute this instruction. An exception handler is a software program that is automatically executed by the processing unit 20 when the processing unit 20 encounters an error. The exception handler may be part of the instructions 22 located in the ROM device 21, or may be written in a different memory device.

Figure 2:
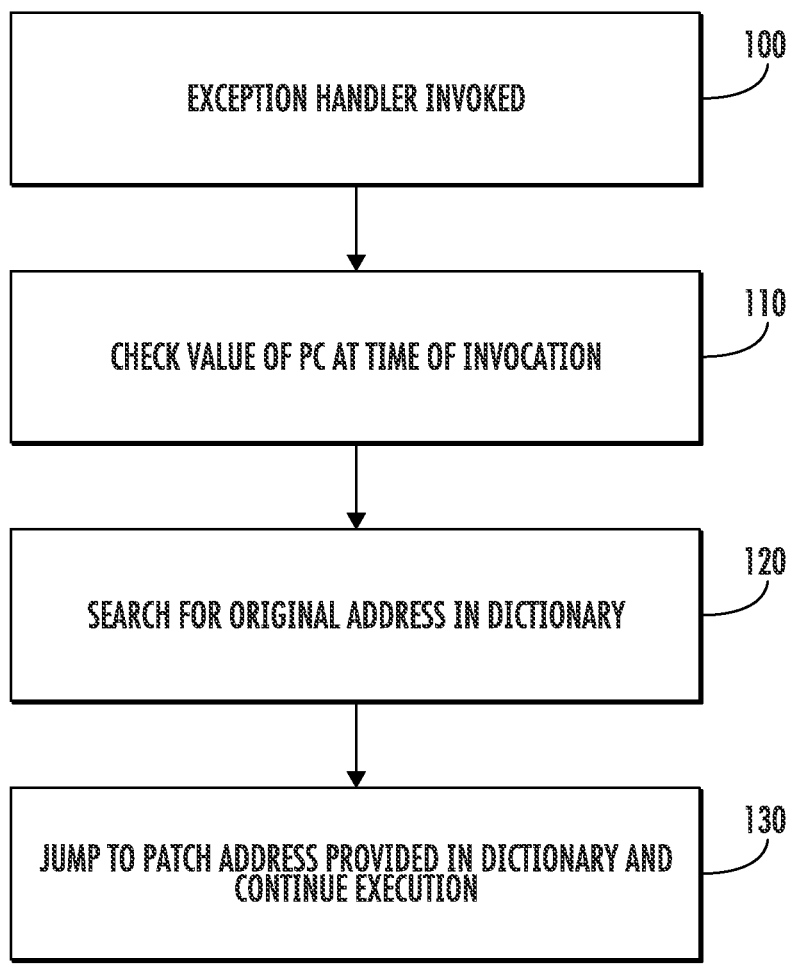
FIG. 2 shows a flowchart that shows the operation of the device when an ECC error is encountered.

FIG. 2 shows the operation of the processing unit 20 when executing this exception handler. First, as shown in Box 100, the exception handler is invoked when the processing unit 20 attempts to execute an instruction with an ECC error. The address of the exception handler may be written to a vector table that the processing unit 20 accessed when an exception is encountered. The processing unit 20 then executes the instructions contained within the exception handler. The exception handler causes the processing unit to determine the value of the program counter (PC) at the time of the exception, as shown in Box 110. This value is the address of the instruction that the processing unit 20 was accessing when the ECC error occurred. Having determined this address (which is referred to as the original address), the exception handler then causes the processing unit 20 to access the dictionary 27, searching the entries in the dictionary 27 for the original address, as shown in Box 120. Once the original address is found, the patch address, which is stored in an entry with the original address, is then loaded into the program counter and execution continues at this patch address, as shown in Box 130. After the patched function is executed, the program counter returns to an address located within the ROM device 21.

Figure 3:
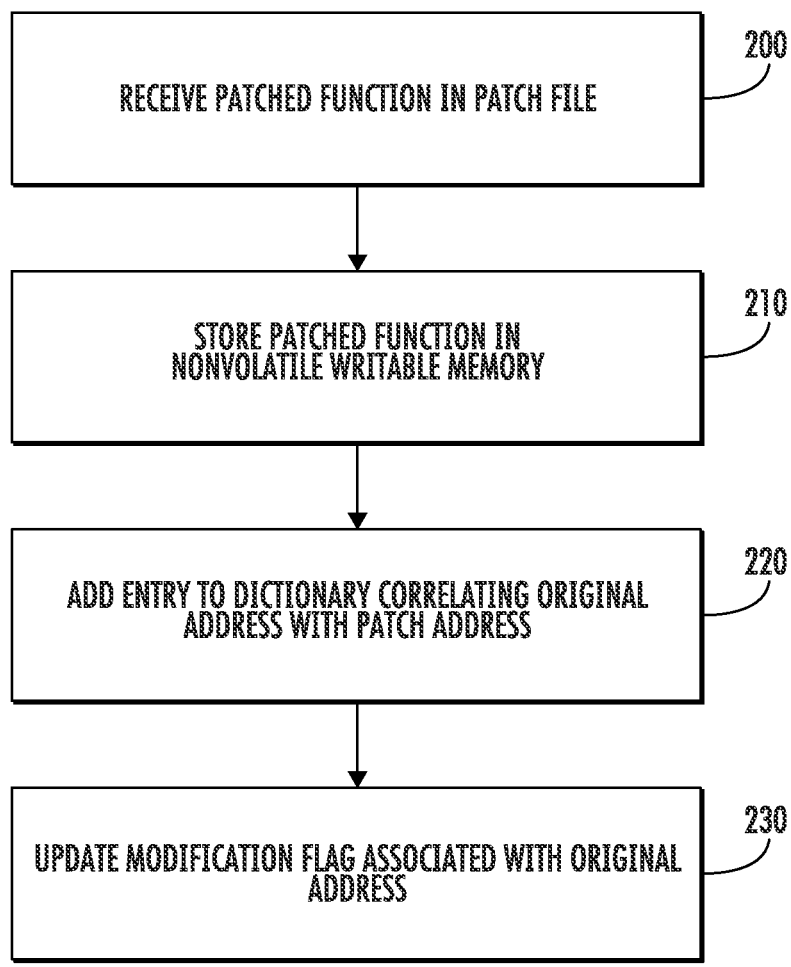
FIG. 3 shows a flowchart that may be executed to patch a function according to one embodiment.

Thus, the method of patching a function includes the following steps, which are shown in FIG. 3. First, the new patched function is delivered to the network device 10 as part of a patch file, as shown in Box 200. The patch file contains the address of the original function that is being patched as well as the new patched code. The new patched function is stored in a portion of the nonvolatile writable memory device 25 that is reserved for patched functions 26, as shown in Box 210. An entry in the dictionary 27 is then created that correlates the original address in the ROM device 21 with the patch address in the nonvolatile writable memory device 25, as shown in Box 220. The modification flag 29 associated with the instruction at the original address of the function in ROM device 21 is then set to the second value, indicating that the instruction or function at that original address has been modified, as shown in Box 230.

Note that the modification flag 29 is located in the writable memory 28. If this writable memory 28 is nonvolatile, then no other actions need to be taken. However, in certain embodiments, to improve speed of execution, it may be desirable to retain the modification flags 29 in a volatile memory, as these have faster access times. In this case, the modification flags 29 may also be stored in a secondary nonvolatile memory, such as the nonvolatile writable memory device 25 or a separate component, such as a FLASH memory 24. At initialization, the modification flags 29 stored in this secondary nonvolatile memory are copied to the writable memory 28. It is the modification flags 29 stored in the writable memory 28 (which in this scenario is a volatile memory) that is accessed when the processing unit 20 accesses an instruction in the ROM device 21. Thus, in this embodiment, when a patch is performed, it is necessary for the patch file to change the modification flags 29 in the secondary nonvolatile memory as well as in the writable memory 28.

As shown in FIG. 2, during operation, the exception handler allows the processing unit 20 to jump to the patched function by determining the patch address from the appropriate entry in the dictionary 27. After the patched function is executed, the program counter returns to an address that is located in the ROM device 21.

Figure 4:
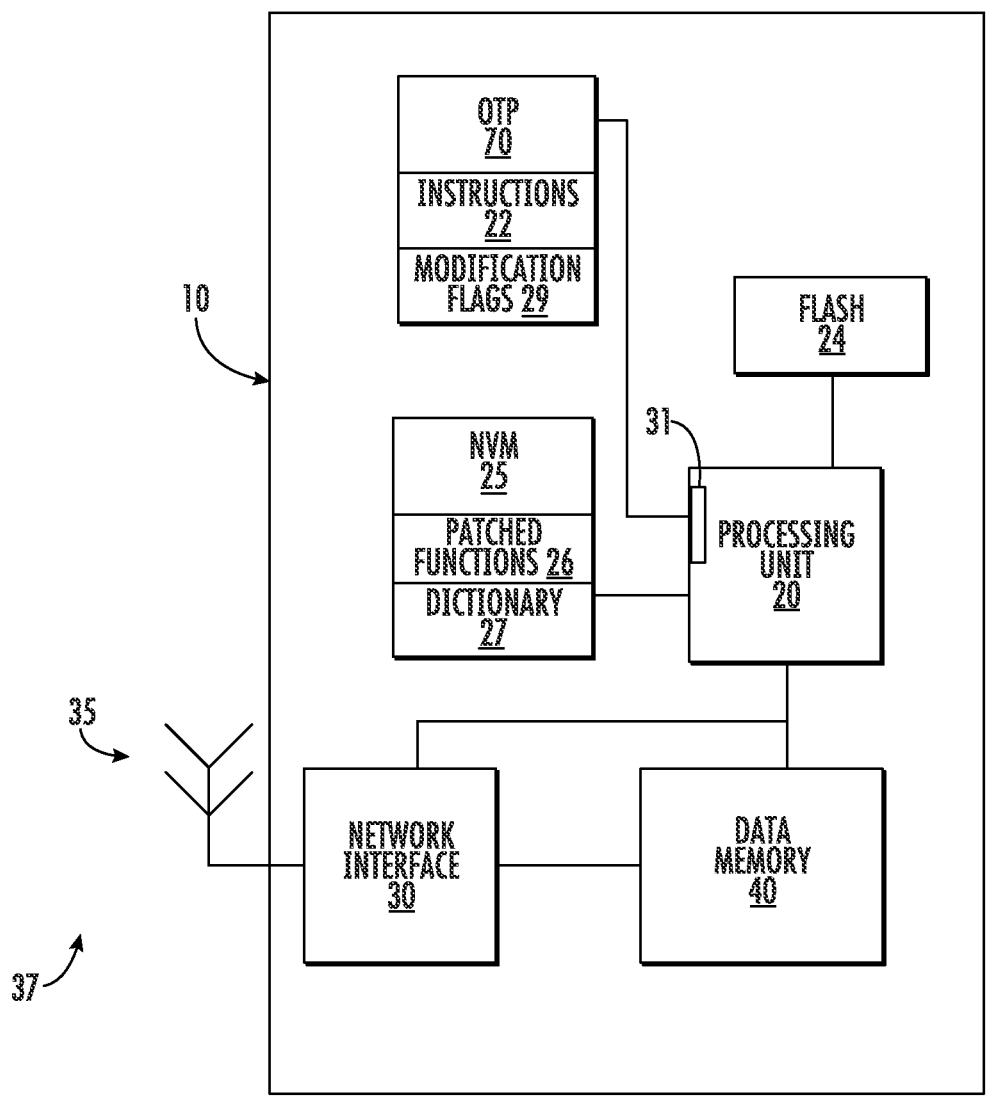
FIG. 4 shows a block diagram of a network device according to a second embodiment.

A similar concept may be applied if the instructions are stored in a one time programmable (OTP) memory device. A block diagram of this configuration is shown in FIG. 4. Components with the same function as those shown in FIG. 1 have been given identical reference designators and will not be described again.

In this embodiment, the instructions 22 are stored in an OTP memory device 70. Note that in this embodiment, the modification flags 29 may also be stored in the OTP memory device 70. Further, while the patched functions 26 and dictionary 27 are shown separately in a nonvolatile writable memory device 25, these may also be included in the OTP memory device 70.

Figure 5A:
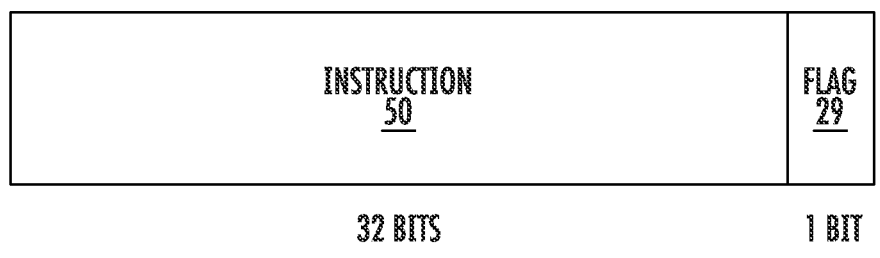
FIG. 5A shows a first memory organization for use with the network device of FIG. 4.

In some embodiments, the OTP memory device 70 may be configured to be 33 bits wide, as shown in FIG. 5A. In this embodiment, each word contains 32 bits of instruction 50 and 1 bit that is the modification flag 29 for that instruction 50. Thus, in operation, a 33 bit word is read by the processing unit 20, where 32 bits are the instruction 50 and the remaining bit is the modification flag 29. This modification flag 29 is used to trigger an ECC error if set to the second value, as described above.

This configuration operates very similar to that described with respect to FIG. 1, except the modification flag 29 is collocated with the instruction 50. The only difference is that, in Box 230, the writing of the modification flag 29 is done on a word that is 33 bits wide. Thus, in one embodiment, the OTP Memory device is configured such that the modification flag 29 can be written without affecting the other 32 bits. In another embodiment, the entire 33 bit wide word is writable as a single entity. In this case, the processing unit may retrieve the current value of that instruction and then append the new value of the modification flag to that instruction before writing to the OTP memory device 70.

Figure 5B:
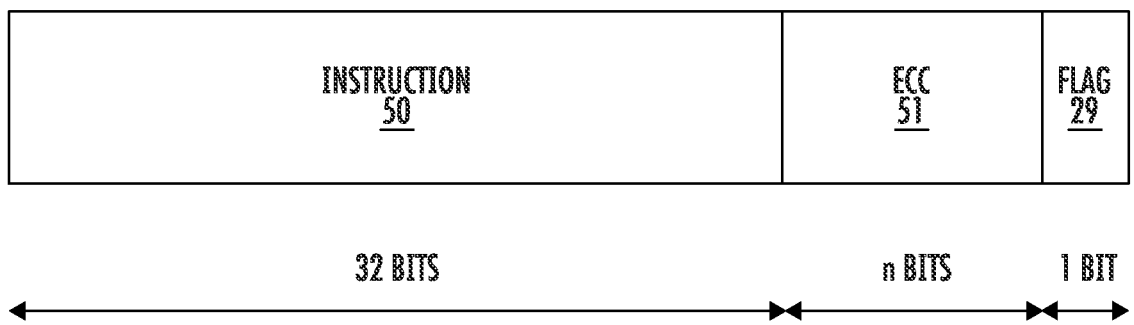
FIG. 5B shows a second memory organization for use with the network device of FIG. 4.

In another embodiment, the OTP memory device 70 may be configured to be wider than 33 bits, as shown in FIG. 5B. For example, in addition to the modification flag 29, each word may also contain an error correcting code (ECC) 51, which may be any number of bits.

In this embodiment, the processing unit 20 or surrounding circuitry includes an error detection circuit 31. This error detection circuit 31 is used to detect and optionally correct errors detected in the instruction 50. The output of the error detection circuit 31 is supplied to the ECC error input of the processing unit 20. Prior to computing whether an ECC error has occurred, the error detection circuit 31 combines the modification flag 29 with the ECC 51 to create an updated ECC value. For example, the value of the modification flag 29 may simply be added to the ECC 51. In another embodiment, one bit of the ECC 51 may be Xored with the modification flag 29. The error detection circuit 31 then computes whether an ECC error has occurred using this updated ECC value.

Note that if the modification flag is set to 0, the updated ECC value is the same as the original ECC. Thus, if an ECC error is detected, a true ECC error has occurred and the exception handler may service this. If, however, the modification flag 29 is set to the second value, which is non zero, the updated ECC value differs from the actual ECC. Thus, an ECC error will occur. However, in this case, there is no actual ECC error; rather, the ECC error indicates that there is a patched function available.

Thus, in this case, the exception handler first checks the state of the modification flag at the address where the ECC error occurred. If the modification flag is set to a nonzero value, it executes the sequence shown in FIG. 2. If the modification flag 29 is set to 0, then a true ECC error has occurred and the exception handler addresses this issue.

As described above with respect to FIG. 5A, if the modification flag 29 needs to be rewritten, the contents of that entire word, including the instruction 50 and the ECC 51 may be read and the new value of the modification flag 29 is appended to that word prior to being written to the OTP memory device 70. However, in some embodiments, the modification flag 29 may be writable without affecting the other bits at that address. In this case, the modification flag 29 is simply written with the new value.

The present system and methods have many advantages. The present method allows for an efficient mechanism to patch software that is located in a ROM or OTP memory device. Most processing units include an input that signifies an exception error, such as a parity or ECC error. By utilizing that input, the exception handler may be invoked, which causes the patched function to be executed. Further, the inclusion of a modification flag for each instruction has no affect on the structure or creation of the underlying software image and does not require the software to be written to include jumps or checks for patches. Furthermore, as ECC becomes more commonly used, this technique will add very little in terms of added memory or complexity to the overall system.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of updating software located in a read only memory (ROM) device, comprising:
   storing a modified function at a patch address in a nonvolatile writable memory device;
   creating an entry in a dictionary located in the nonvolatile writable memory device, wherein the entry comprises an original address of an original function in the ROM device and the patch address; and
   intentionally causing an ECC (Error Correction Code) error to occur when the original address in the ROM device is accessed so as to invoke an exception.

2. The method of claim 1, wherein a modification flag is associated with each instruction in the ROM device, wherein each modification flag has a first value when the instruction in the ROM device is to be executed and a second value when a patched function is available, wherein intentionally causing the ECC error comprises writing the second value to the modification flag associated with an instruction at the original address.

3. The method of claim 2, wherein the modification flags are stored in the nonvolatile writable memory device.

4. The method of claim 2, wherein the modification flags are stored in a volatile memory.

5. The method of claim 2, wherein the modification flag is provided to an input to a processing unit which is used to indicate the ECC error.

6. A method of executing instructions located in a read only memory (ROM) device or a one time programmable (OTP) memory device, using a processing unit, wherein the instructions include a function that has been modified and a patched function is located at a patch address in a nonvolatile writable memory device, the method comprising:
   encountering an ECC (Error Correcting Code) error at an original address in the ROM device or OTP memory device, wherein the ECC error was intentionally created;
   invoking an exception handler, wherein the exception handler:
   determines a value of a program counter when the ECC error occurred, the value of the program counter being the original address; and
   uses the original address to index into a dictionary to find the patch address; and
   executes the patched function located at the patch address.

7. The method of claim 6, wherein a modification flag is accessed with each instruction in the ROM device or OTP memory device, and wherein the modification flag is used to intentionally cause the ECC error.

8. The method of claim 7, wherein the function is located in an OTP memory device.

9. The method of claim 6, wherein data at the original address includes an instruction and a modification flag, and wherein the modification flag is used to intentionally cause the ECC error.

10. The method of claim 6, wherein data at the original address includes an instruction, an ECC and a modification flag, and wherein the modification flag is combined with the ECC to create an updated ECC value, wherein the updated ECC value is used to intentionally cause an ECC error.

11. The method of claim 10, wherein, after the ECC error is detected, the exception handler checks a state of the modification flag to determine if a patched function is available.

12. A method of updating software located in a one time programmable (OTP) memory device, comprising:
storing a modified function at a patch address in a nonvolatile writable memory device;
creating an entry in a dictionary located in the nonvolatile writable memory device, wherein the entry comprises an original address of an original function in the OTP memory device and the patch address; and
intentionally causing an ECC (Error Correcting Code) error to occur when the original address in the OTP memory device is accessed so as to invoke an exception.

13. The method of claim 12, wherein a width of the OTP memory device is configured to include an instruction and a modification flag, wherein intentionally causing the ECC error comprises writing a second value, different than a default value, to the modification flag.

14. The method of claim 13, wherein the modification flag is provided to an input to a processing unit which is used to indicate the ECC error.

15. The method of claim 12, wherein a width of the OTP memory device is configured to include an instruction, an ECC and a modification flag, wherein intentionally causing the ECC error comprises writing a second value, different than a default value, to the modification flag.

16. The method of claim 15, wherein the modification flag is combined with the ECC to create an updated ECC value and the updated ECC value is used to detect whether the ECC error occurred.

17. The method of claim 12, wherein the nonvolatile writable memory device is the OTP memory device, such that the original function, the dictionary and the modified function are all resident within the OTP memory device.

* * * * *